United States Patent
Okada et al.

(10) Patent No.: US 6,826,302 B2
(45) Date of Patent: Nov. 30, 2004

(54) LUMINANCE CORRECTION OF COLORLESS LOW SATURATION REGIONS USING CORRECTION CONSTANTS CALCULATED FROM COLOR SATURATION VALUES

(75) Inventors: Seiji Okada, Hirakata (JP); Yukio Mori, Hirakata (JP); Tetsuo Mise, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 637 days.

(21) Appl. No.: 09/851,427

(22) Filed: May 9, 2001

(65) Prior Publication Data

US 2002/0015523 A1 Feb. 7, 2002

(30) Foreign Application Priority Data

May 12, 2000 (JP) ........................... 2000-141008

(51) Int. Cl.[7] ................................ G06K 9/00
(52) U.S. Cl. ................ 382/167; 382/264; 348/223.1; 348/294; 348/298; 348/207.99
(58) Field of Search .................. 382/162, 167, 382/264; 358/1.9; 348/207.99, 208.13, 223.1, 225.1, 234–238, 250, 294, 298, 311, 336

(56) References Cited

U.S. PATENT DOCUMENTS

| | | | |
|---|---|---|---|
| 6,346,999 B1 | * | 2/2002 | Udagawa et al. ............ 358/520 |
| 6,400,403 B1 | * | 6/2002 | Saito ............................ 348/273 |
| 6,690,418 B1 | * | 2/2004 | Terasawa et al. ........... 348/235 |
| 2002/0140831 A1 | * | 10/2002 | Hayashi ....................... 348/272 |

FOREIGN PATENT DOCUMENTS

| | | |
|---|---|---|
| JP | 2-105693 | 4/1990 |
| JP | 5-211653 | 8/1993 |
| JP | 10-023437 | 1/1998 |
| JP | 11-055680 | 2/1999 |
| JP | 11-177995 | 7/1999 |
| JP | 11-308634 | 11/1999 |

* cited by examiner

Primary Examiner—Bhavesh M. Mehta
Assistant Examiner—Ali Bayat
(74) Attorney, Agent, or Firm—Arent Fox PLLC

(57) ABSTRACT

In image signal processing, the color saturation values of image signals are accumulated within each of a plurality of color saturation calculation regions by a color saturation accumulator circuit 13, and the image signals obtained in a color saturation calculation region in which the result of the color saturation value accumulation thus performed by the color saturation accumulator circuit 13 is low are accumulated for each of image signal types C1 to C4 by an image signal accumulator circuit 14. Based on the results of this accumulation performed for each of the image signal types C1 to C4, constants with which to counterbalance the amounts of light transmitted for the image signals C1 to C4 are determined and fed to a transmitted light amount corrector circuit 1. Moreover, based on the results of the color saturation value accumulation performed for each color saturation calculation region by the color saturation accumulator circuit 13, weight factors are determined and fed to a luminance signal generator circuit 6. The luminance signal generator circuit 6 receives, through a VLPF 4, the image signals for which the amounts of light transmitted have been counterbalanced by the transmitted light amount corrector circuit 1, and also receives image signals produced by smoothing the image signals obtained from one set of a plurality of adjacent pixels after another through the VLPF4 and an HLPF 5. The luminance signal generator circuit 6 produces luminance signals by adding together these signals with the weight factors assigned thereto.

16 Claims, 8 Drawing Sheets

LUMINANCE CORRECTION OF COLORLESS LOW SATURATION REGIONS USING CORRECTION CONSTANTS CALCULATED FROM COLOR SATURATION VALUES

BACKGROUND OF THE INVENTION

1. Field of the Invention

The present invention relates to an image signal processing device and an image signal processing method used to obtain luminance signals for individual pixels from a plurality of chrominance signals.

2. Description of the Prior Art

Conventional Method of Producing Luminance Signals

First, a conventionally typical method of producing luminance signals from the image signals output from a CCD (charge-coupled device) provided with a plurality of types of color filters will be described. Here, as shown at (a) in FIG. 8, the image signals are assumed to be output from a CCD provided with four types of color filters, namely color filters for M (magenta), G (green), Y (yellow), and C (cyan) colors. As shown at (a) in FIG. 8, the CCD has two types of columns of color filters arranged alternately, specifically columns in which color filters are arranged in the order of M, Y, G, and Y and columns in which color filters are arranged in the order of G, C, M, and C.

This CCD outputs image signals obtained from two adjacent rows in combination. Specifically, as shown at (b) in FIG. 8, for every two rows, the CCD outputs image signals M+Y, G+C, G+Y, and M+C, which are expressed also as C1=M+Y, C2=G+C, C3=G+Y, and C4=M+C, respectively. Where image signals are output in this way, the colors M, C, and Y are expressed, in terms of primary colors R (red), G (green), and B (blue), as M=R+B, C=G+B, and Y=R+G, respectively. Hence, the image signals C1, C2, C3, and C4 are expressed, in terms of primary colors R, G, and B, as C1=2R+G+B, C2=2G+B, C3=2G+R, and C4=2B+G+R, respectively.

Since the image signals output from the CCD have color components superimposed on luminance signals, those image signals have different signal levels in different columns in a colored portion of the image they represent, even if color saturation is low there, as shown at (c) in FIG. 8. The difference between C1 and C2 and the difference between C3 and C4 are color components. By passing such image signals through a low-pass filter, it is possible to obtain smoothed signals 2R+3G+2B, which are direct-current components, and these signals are used as luminance signals.

A conventional image signal processing device operating in this way is shown in FIG. 9. The image signal processing device shown in FIG. 9 is, for example, a device for extracting luminance signals from image signals output from an image-sensing device, such as a single-panel color CCD, provided with a plurality of types of filters. Suppose that, this image signal processing device is fed with image signals from the above-described CCD provided with four types of, i.e. M, G, Y, and C, color filters. As described above, the CCD outputs one image signal for every two pixels provided with two vertically adjacent filters.

When the image signal processing device is fed with image signals from the CCD, the image signals are fed to a line memory 51 and to a vertical-direction low-path filter (hereinafter referred to as the "VLPF") 53. The image signals output from the line memory 51 are fed to a line memory 52 and to the VLPF 53, and the image signals output from the line memory 52 also are fed to the VLPF 53. In this way, image signals from one row after another are stored in the line memory 51 and then in the line memory 52, and thus image signals from three vertically adjacent rows are fed to the VLPF 53. Specifically, the image signals from the first row are fed from the line memory 52 to the VLPF 53, the image signals from the second row are fed from the line memory 51 to the VLPF 53, and the image signals from the third row are fed directly from the CCD to the VLPF 53.

The VLPF 53, fed with image signals in this way, produces image signals by taking averages of the first-row image signals fed thereto from the line memory 52 and the third-row image signals fed thereto directly from the CCD, and feeds the resulting image signals, together with the second-row image signals fed thereto from the line memory 51, to a horizontal-direction low-pass filter 54 (hereinafter referred to as the "HLPF") 54. The HLPF 54 is fed with image signals from three columns, and produces image signals by taking averages of the image signals from the first and third columns. In this way, the VLPF 53 and the HLPF 54 calculate the signal levels of the image signals C1 to C4 for the individual pixels, and then the HLPF 54 feeds luminance signals of which the signal levels are equal to the averages of the signal levels of the thus calculated image signals C1 to C4 to a luminance signal processing circuit 55.

Specifically, for example, when the VLPF 53 and the HLPF 54 produce luminance signals for the pixels from which the image signals C1 are obtained, they calculate the signal levels of the image signals C2 to C4 plausibly, and then the HLPF 54 produces luminance signals of which the signal levels are equal to the averages of the signal levels of the image signals C2 to C4 thus plausibly calculated and the image signals C1. Thereafter, the luminance signal processing circuit 55 further varies the signal levels of the luminance signals fed thereto from the HLPF 54 by performing edge enhancement and other processing thereon, and then outputs the thus processed luminance signals.

In this way, luminance signals are produced from the image signals obtained from a solid-state image-sensing device such as a CCD. However, as shown in FIG. 8, the luminance signals thus produced are not luminance signals that correspond one to one to the individual image signals, but signals obtained by passing the image signals through low-pass filters, and are thus signals of which each has a signal level proportional to the average of two image signals. This makes it impossible to reproduce variations in luminance in the detail of the subject.

SUMMARY OF THE INVENTION

An object of the present invention is to provide an image signal processing device and an image signal processing method that produce luminance signals with which images can be reproduced with enhanced resolution and definition.

To achieve the above object, according to one aspect of the present invention, an image signal processing device for producing luminance signals from image signals output from a solid-state image-sensing device having a plurality of types of color filters arranged one for each of the pixels thereof is provided with: an image signal accumulator for accumulating, for each of the types of color filters provided for the pixels of the solid-state image-sensing device, the signal levels of the image signals output from those of the pixels which are sensing a low color saturation region in which color saturation is low; a transmitted light amount corrector for producing, based on correction constants given one for each of the types of color filters provided for the pixels of the solid-state image-sensing device, corrected image signals by correcting the image signals output from the pixels of the solid-state image-sensing device in order to counterbalance, for each of the types of color filters, the amounts of light transmitted through the color filters; a correction constant calculator for setting, based on the signal levels of the image signals accumulated for each of the types of color filters, the correction constants one for each of the types of color filters and feeding the thus set correction constants to the transmitted light amount corrector; a first luminance signal generator for smoothing the corrected image signal currently being fed thereto from the transmitted light amount corrector as obtained from the currently targeted pixel and the corrected image signals obtained from a plurality of pixels located in the neighborhood of the currently targeted pixel in order to produce a luminance signal for the currently targeted pixel; and a second luminance signal generator for newly producing a luminance signal for the currently targeted pixel based on the corrected image signal fed thereto from the transmitted light amount corrector as obtained from the currently targeted pixel and the luminance signal for the currently targeted pixel fed thereto from the first luminance signal generator.

According to another aspect of the present invention, an image signal processing method for producing luminance signals from image signals output from a solid-state image-sensing device having a plurality of types of color filters arranged one for each of the pixels thereof includes: a step of accumulating, for each of the types of color filters provided for the pixels of the solid-state image-sensing device, the signal levels of the image signals output from those of the pixels which are sensing a low color saturation region in which color saturation is low; a step of setting, based on the signal levels of the image signals accumulated for each of the types of color filters provided for the pixels of the solid-state image-sensing device, correction constants with which to counterbalance the amounts of light transmitted through the color filters provided for the pixels that are sensing the low color saturation region; a step of producing corrected image signals by multiplying by the correction constants the image signals output from the pixels of the solid-state image-sensing device that are sensing the low color saturation region; and a step of using the corrected image signals as luminance signals for the pixels of the solid-state image-sensing device that are sensing the low color saturation region.

According to still another aspect of the present invention, an image signal processing method for producing luminance signals from image signals output from a solid-state image-sensing device having a plurality of types of color filters arranged one for each of the pixels thereof includes: a step of accumulating, for each of the types of color filters provided for the pixels of the solid-state image-sensing device, the signal levels of the image signals output from those of the pixels which are sensing a low color saturation region in which color saturation is low; a step of setting, based on the signal levels of the image signals accumulated for each of the types of color filters provided for the pixels of the solid-state image-sensing device, correction constants with which to counterbalance the amounts of light transmitted through the color filters provided for the pixels that are sensing the low color saturation region; a step of producing corrected image signals by multiplying by the correction constants the image signals output from the pixels of the solid-state image-sensing device that are sensing the low color saturation region; and a step of using, as luminance signals for the image signals, signals produced by adding together the corrected image signals and smoothed image signals produced by smoothing the image signals obtained from one set after another of a plurality of adjacent pixels, wherein the corrected image signals and the smoothed image signals are added together with predetermined weights assigned thereto.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Method of Producing Luminance Signals According to the Invention

Figure 8:
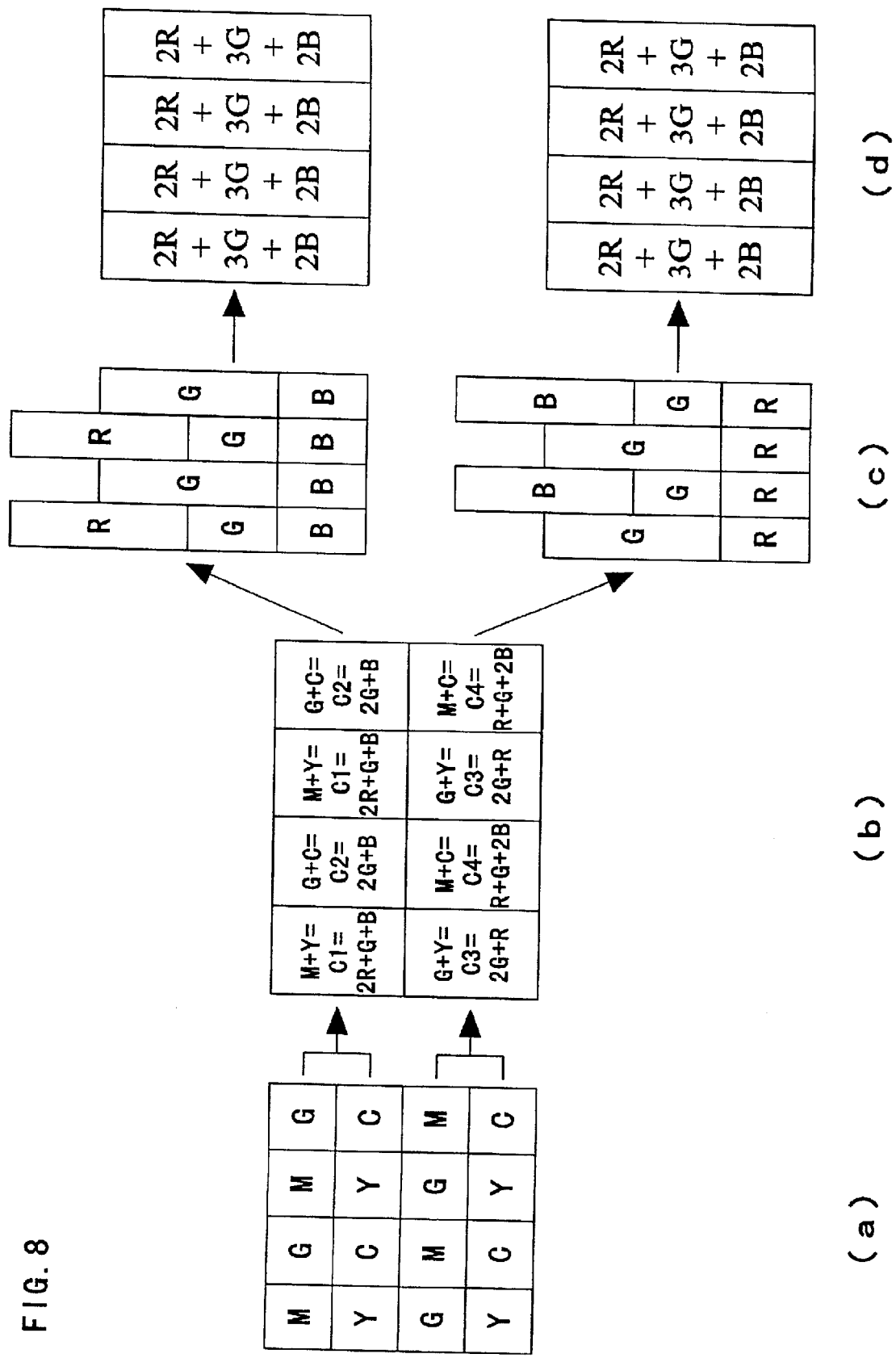
FIG. 8 is a diagram showing an outline of how the image signals output from a CCD are processed conventionally.

First, with reference to FIG. 1, an outline of how luminance signals are produced according to the present invention will be described. A CCD having M, G, C, and Y color filters arranged as shown at (a) in FIG. 1, i.e. in the same manner as shown at (a) in FIG. 8, outputs image signals C1, C2, C3, and C4 as shown at (b) in FIG. 1, i.e. in the same manner as shown at (b) in FIG. 8. Thus, if these image signals C1, C2, C3, and C4 are assumed to contain primary color, i.e. R, G, and B, components of equal magnitude, they are expressed, in terms of primary colors R (red), G (green), and B (blue), as shown at (c) in FIG. 1.

Specifically, when a subject with low color saturation, such as a white subject, is shot with the CCD, and thus the CCD outputs image signals containing primary-color, i.e. R, G, and B, components of substantially equal magnitude, the individual image signals C1, C2, C3, and C4 have the relations C1>C2 and C3<C4. As a result, if these image signals are used as luminance signals, the luminance signals have different magnitude in different columns, where they should have substantially equal magnitude.

Figure 1:
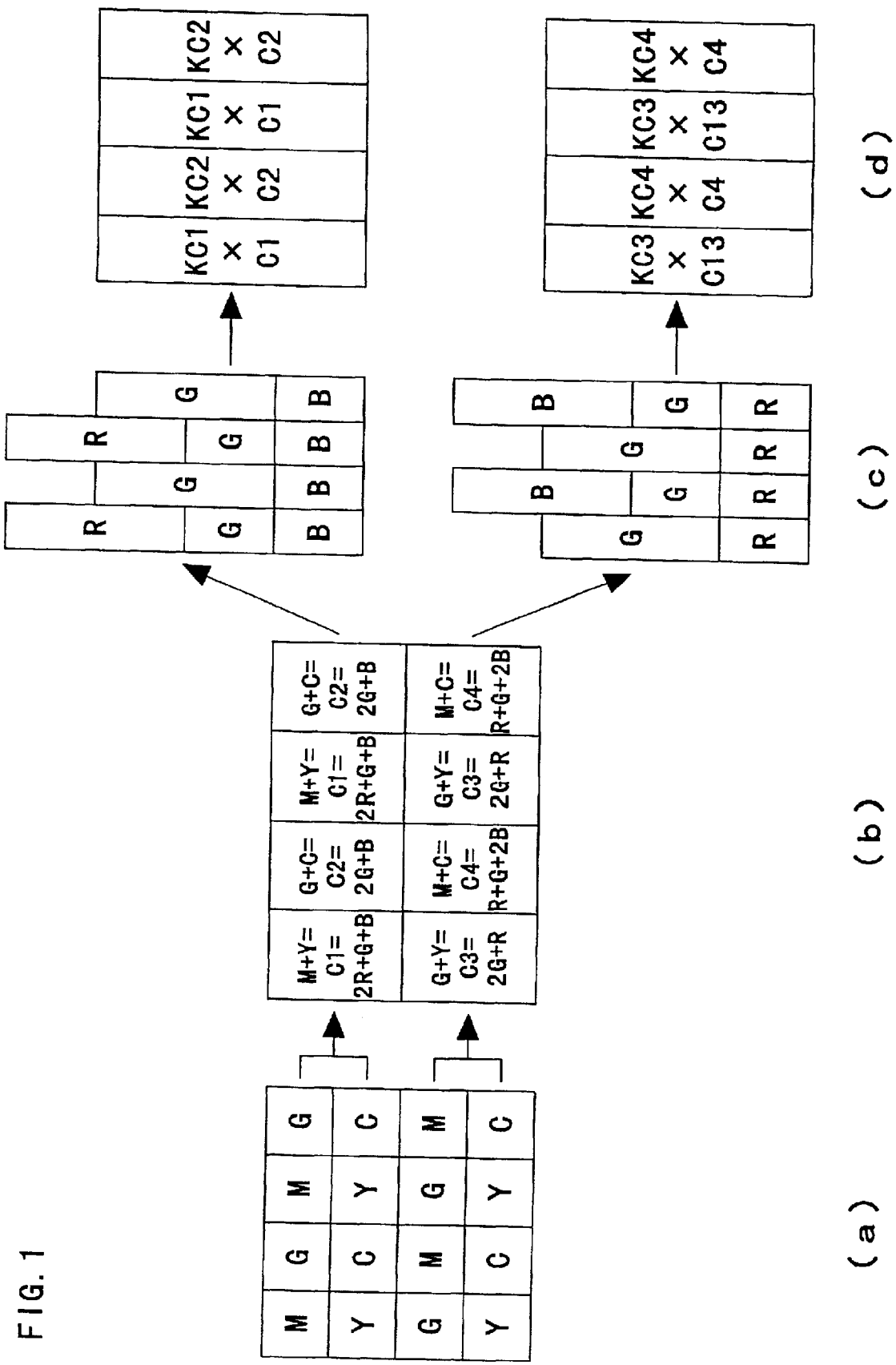
FIG. 1 is a diagram showing an outline of how the image signals output from a CCD are processed according to the invention.

Then, as shown at (d) in FIG. 1, the image signals C1, C2, C3, and C4 are multiplied by correction constants KC1, KC2, KC3, and KC4, respectively, so that the amounts of light transmitted for those image signals are counterbalanced. Here, if the reference values of the signal levels of the image signals C1, C2, C3, and C4 with reference to which to counterbalance the amounts of light transmitted are assumed to be c1, c2, c3, and c4, respectively, the image signals C1, C2, C3, and C4 are multiplied by the correction constants KC1, KC2, KC3, and KC4 such that KC1×c1=KC2×c2=KC3×c3=KC4×c4. The reference values of the signal levels of the image signals C1, C2, C3, and C4 with reference to which to counterbalance the amounts of light transmitted are obtained, for example, by accumulating the image signals C1 to C4 obtained from a colorless region.

In this way, when image signals are fed from a colorless region in which color saturation is low, the image signals C1, C2, C3, and C4 multiplied by the correction constants KC1, KC2, KC3, and KC4 and thereby corrected are output as luminance signals. The luminance signals thus obtained are not averages of every two adjacent image signals as obtained by conventional methods, but signals that correspond one to one to the individual image signals. This helps enhance resolution in colorless regions in which color saturation is low. On the other hand, when image signals are fed from a colored region in which color saturation is high, the image signals C1, C2, C3, and C4 multiplied by the correction constants KC1, KC2, KC3, and KC4 and thereby corrected are then passed through a low-pass filter so that the image signals thus smoothed are output as luminance signals as practiced in conventional methods.

Hereinafter, as embodiments of the present invention, image signal processing devices that adopt the above-described method of producing luminance signals will be described.

First Embodiment

Figure 2:
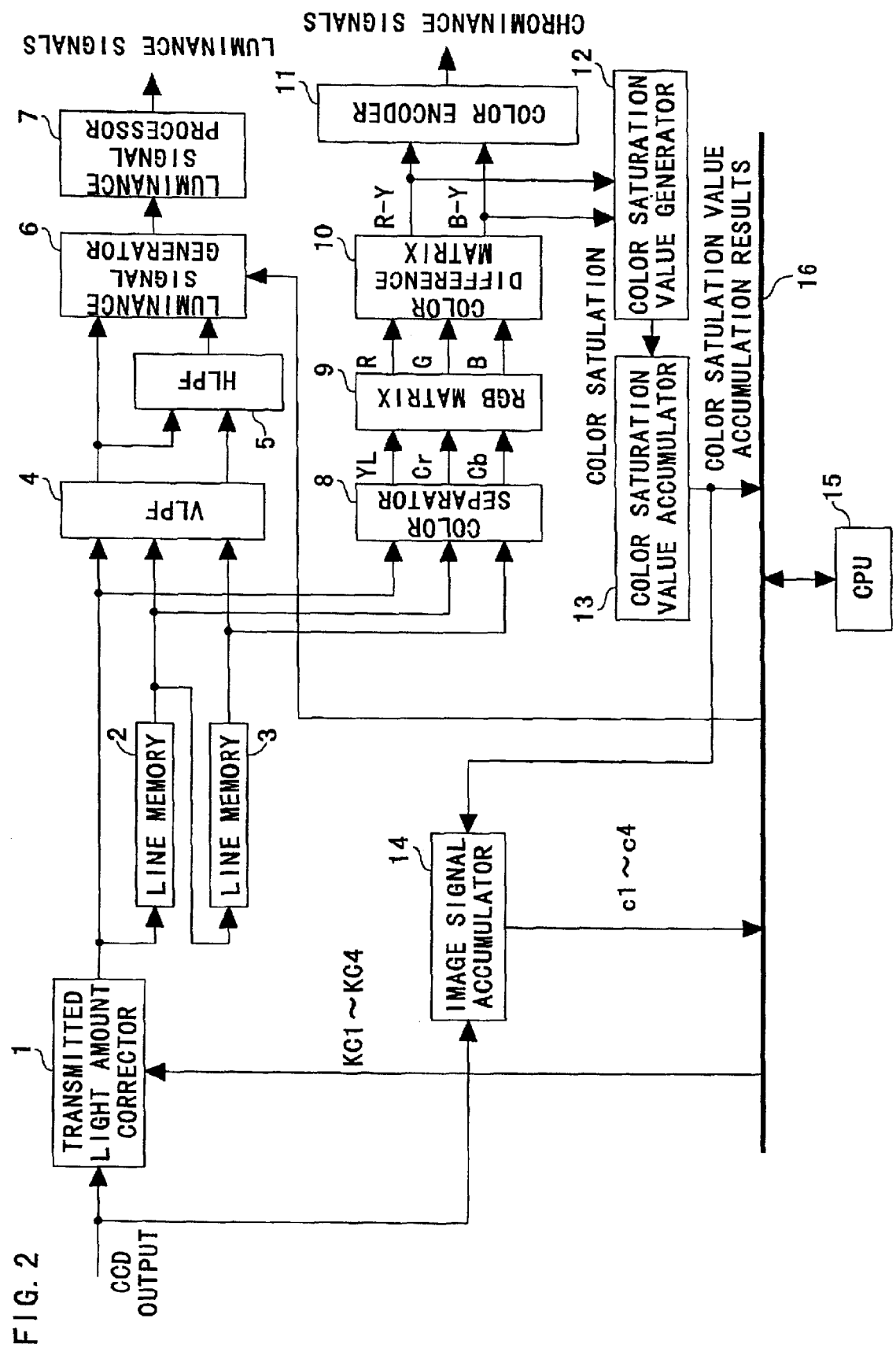
FIG. 2 is a block diagram showing the internal configuration of the image signal processing device of a first embodiment of the invention.
Figures 3, 4:
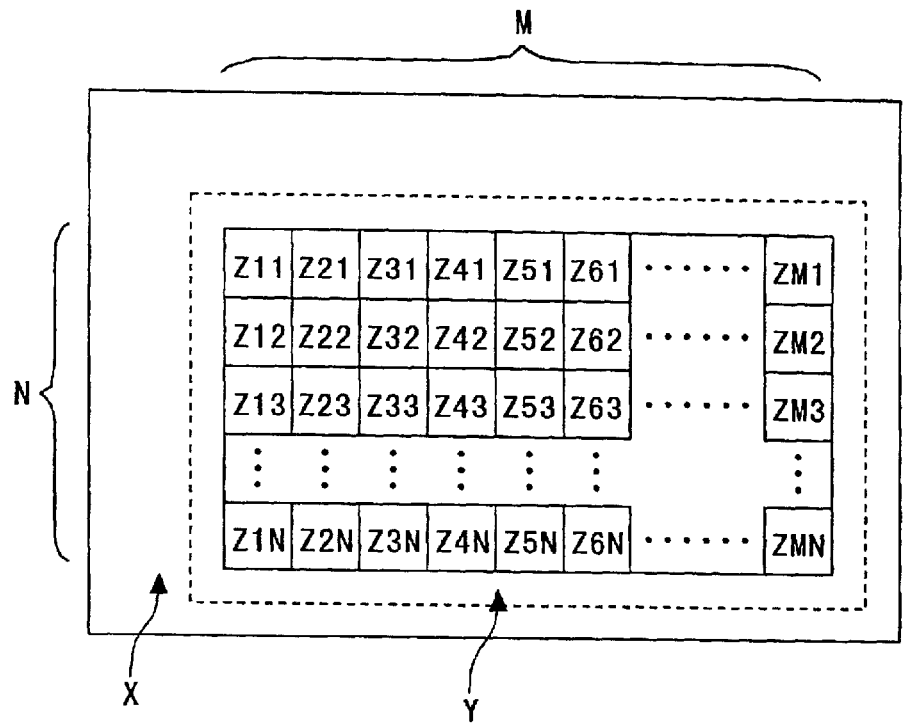
FIG. 3 is a diagram schematically showing the arrangement of image signals.
FIG. 4 is a diagram showing the state of a color saturation calculation region.

The image signal processing device of a first embodiment of the invention will be described below with reference to the drawings. FIG. 2 is a bock diagram showing the internal configuration of the image signal processing device of this embodiment. FIG. 3 is a diagram schematically showing an image reproduced on the basis of the signals output from a CCD.

1. Configuration of the Image Signal Processing Device

The image signal processing device shown in FIG. 2 is provided with a transmitted light amount corrector circuit 1 that corrects image signals C1 to C4 fed from a CCD by multiplying them by correction constants KC1 to KC4, respectively, a line memory 2 that is fed with image signals from the transmitted light amount corrector circuit 1, a line memory 3 that is fed with image signals from the line memory 2, a VLPF 4 that is fed with image signals from the transmitted light amount corrector circuit 1 and from the line memories 2 and 3, an HLPF 5 that is fed with the signals processed by the VLPF 4, a luminance signal generator circuit 6 that is fed with the signals processed by the VLPF 4 and the HLPF 5, and a luminance signal processor circuit 7 that subjects the luminance signals fed from the luminance signal generator circuit 6 to edge enhancement and other processing. These circuits produce luminance signals.

The image signal processing device shown in FIG. 2 is further provided with a color separator circuit 8 that is fed with image signals from the transmitted light amount corrector circuit 1 and from the line memories 2 and 3, an RGB matrix circuit 9 that is fed with the signals processed by the color separator circuit 8, a color-difference matrix circuit 10 that is fed with the color, i.e. R, G, and B, signals produced by the RGB matrix circuit 9, and a color encoder circuit 11 that is fed with the color-difference signals produced by the color-difference matrix circuit 10. These circuits produce chrominance signals. The image signal processing device shown in FIG. 2 is further provided with a color saturation value generator circuit 12 that determines color saturation on the basis of the color-difference signals produced by the color-difference matrix circuit 10.

The image signal processing device shown in FIG. 2 is further provided with a color saturation value accumulator circuit 13 that accumulates the color saturation values, obtained for each of the image signals, fed from the color saturation value generator circuit 12 within each of a plurality of color saturation calculation regions, which will be described later, an image signal accumulator circuit 14 that accumulates the signal levels of the image signals, separately for C1 to C4, that are obtained from a color saturation calculation region in which color saturation is low, a CPU 15 that is fed with the results of the accumulation performed by the color saturation value accumulator circuit 13 and the image signal accumulator circuit 14 and that, on the basis of these results, calculates the correction constants KC1 to KC4, and a bus 16 by way of which the individual circuit blocks exchange data.

Moreover, as shown in FIG. 3, when an image constituting one frame is reproduced on the basis of signals output from the CCD, the whole image area is divided into a region X that corresponds to the blanking periods in which output signals other than image signals are fed from the CCD and an effective image region Y in which an image is reproduced from image signals. As shown in FIG. 3, in this effective image region Y, a number M×N (where M and N each represent a natural number) of color saturation calculation regions Z11 to ZMN are provided. Here, the color saturation calculation regions Z11 to ZMN are each a region in which a portion of the whole image that corresponds to a number m×n (where m and n each represent a natural number) of image signals is reproduced. In FIG. 4, each square corresponds to one image signal.

In this way, in each field, color saturation calculation regions Z11 to ZMN are provided, and the image signals are processed on the basis of these color saturation calculation regions Z11 to ZMN by the image signal processing device configured as shown in FIG. 2. Now, how the image signal processing device configured as shown in FIG. 2 operates will be described, from one circuit block thereof to another.

2. Operation of Part of the Luminance Signal Generating Block

Figure 9:
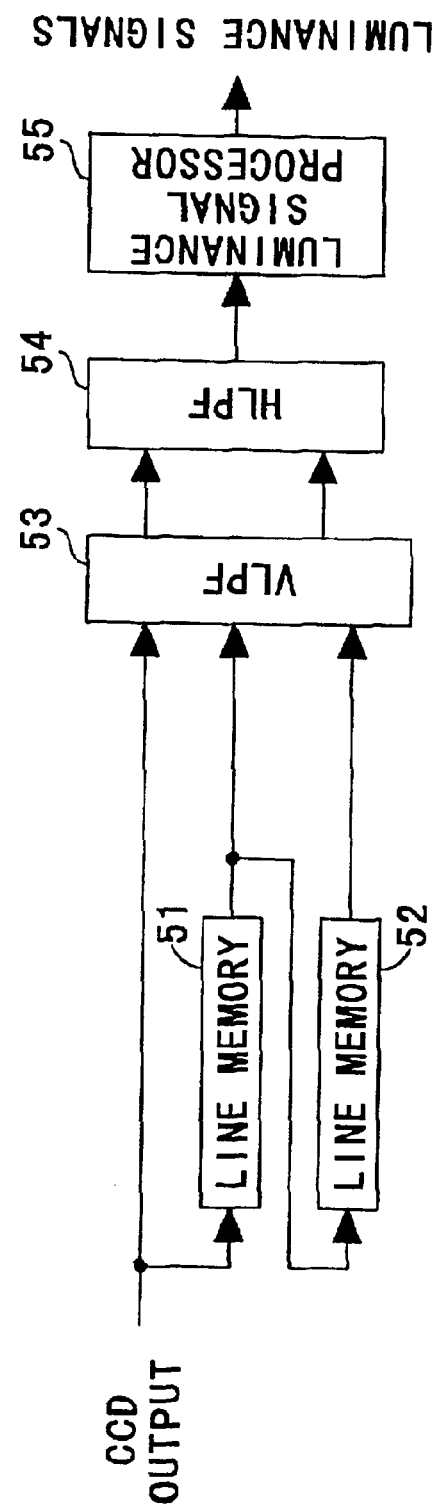
FIG. 9 is a block diagram showing the internal configuration of a conventional image signal processing device.

First, the operation of the line memories 2 and 3, the VLPF 4, and the HLPF 5 will be described. These circuit blocks operate in the same manner as the line memories 51 and 52, the VLPF 53, and the HLPF 54 in the conventional image signal processing device (FIG. 9). Specifically, the image signals of a first row are corrected by the transmitted light amount corrector circuit 1 and are then stored in the line memory 3. Then, the image signals of a second row are corrected by the transmitted light amount corrector circuit 1 and are then stored in the line memory 2. Then, the image signals of the first row stored in the line memory 3 and the image signals of the second row stored in the line memory 2 are, together with the image signals of a third line corrected by the transmitted light amount corrector circuit 1, fed simultaneously to the VLPF 4. In this way, the VLPF 4 is fed with image signals of three vertically adjacent rows.

The VLPF 4 produces image signals that are averages of the image signals of the first and third rows, and then feeds these averaged image signals together with the image signals of the second row to the HLPF 5 or to the luminance signal generator circuit 6. The HLPF 5 processes every three horizontally adjacent image signals. Here, from the averaged image signals produced by the VLPF 4 and the image signals of the second row, the HLPF 5 produces image signals that are averages of the image signals of the first and third columns. In this way, the VLPF 4 and the HLPF 5 plausibly produce three of the image signals C1 to C4, i.e. those other than the one located in the second row and in the second column. Then, image signals are produced that are averages of the image signals C1 to C4, of which three have been plausibly produced, and the image signals thus produced are then fed to the luminance signal generator circuit 6. The operation of the luminance signal generator circuit 6 will be described later.

Figure 5:
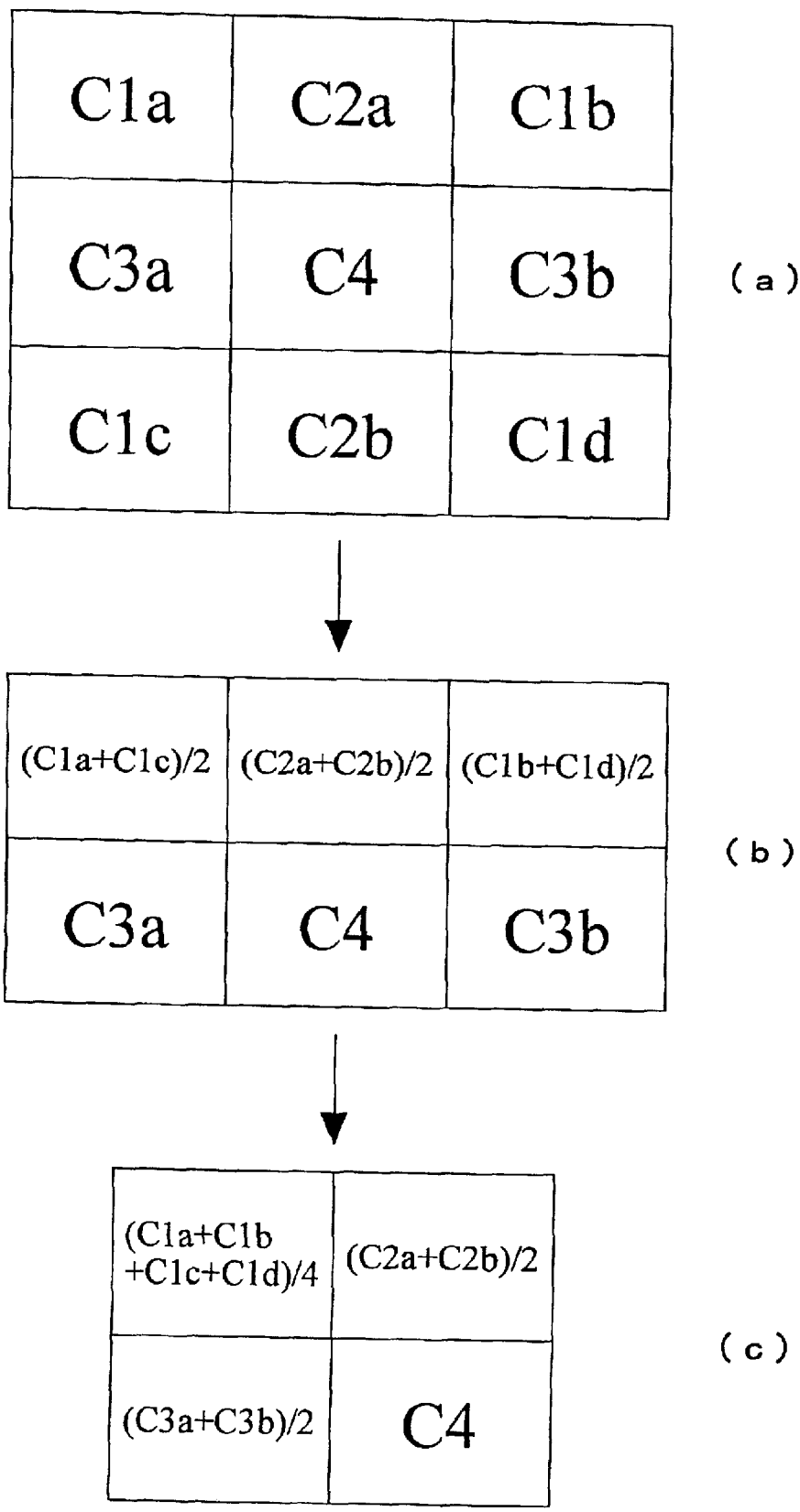
FIG. 5 is a diagram showing an outline of the processing performed by the VLPF and the HLPF.

For example, suppose that, as shown at (a) in FIG. 5, the VLPF 4 is fed with the image signals of the first row from the line memory 3 in the order of C1$a$, C2$a$, and C1$b$, the image signals of the second row from the line memory 2 in the order of C3$a$, C4, and C3$b$, and the image signals of the third row from the transmitted light amount corrector circuit 1 in the order of C1$c$, C2$b$, and C1$d$. Here, C1$a$ to C1$d$ represent the image signal C1, C2$a$ and C2$b$ represent the image signal C2, and C3$a$ and C3$b$ represent the mage signal C3.

When the VLPF 4 is fed with image signals from the transmitted light amount corrector circuit 1 and the line memories 2 and 3 in this way, as shown at (b) in FIG. 5, the VLPF 4 takes averages of the image signals in the first and third rows and then outputs the averaged image signals; on the other hand, the VLPF 4 outputs the image signals of the second row intact. As a result, the HLPF 5 is fed with the averaged image signals in the order of (C1$a$+C1$c$)/2, (C2$a$+C2$b$)/2, and (C1$b$+C1$d$)/2 and the image signals of the second row in the order of C3$a$, C4, and C3$b$.

Then, as shown at (c) in FIG. 5, the HLPF 5 takes averages of the image signals in the first and third columns and outputs the averaged image signals; on the other hand, the HLPF 5 outputs the image signals of the second column intact. As a result, the image signals averaged by the VLPF 4 are output as (C1$a$+C1$b$+C1$c$+C1$d$)/4 and (C2$a$+C2$b$)/2, and the image signals of the second row are output as (C3$a$+C3$b$)/2 and C4. In this way, the image signals C1 to C3 for the pixel that gives the image signal C4 are calculated plausibly. Then, an image signal C is calculated by taking an average of the thus plausibly calculated image signals C1 to C3 and the image signal C4, and the image signal C thus calculated is fed to the luminance signal generator circuit 6. That is, this image signal C is expressed as $$C=(C1a+C1b+C1c+C1d)/16+(C2a+C2b)/8+(C3a+C3b)/8+C4/4$$

Here, C1$a$ to C1$d$, C2$a$, C2$b$, C3$a$, C3$b$, and C4 represent the signal levels of the image signals C1$a$ to C1$d$, C2$a$, C2$b$, C3$a$, C3$b$, and C4, and C represents the signal level of the image signal C.

3. Operation of the Chrominance Signal Generating Block

Next, the operation of the color separator circuit 8, the RGB matrix circuit 9, the color-difference matrix circuit 10, the color encoder circuit 11, and the color saturation value generator circuit 12 will be described. First, the color separator circuit 8 is fed with the image signals of the first row from the line memory 3, the image signals of the second row from the line memory 2, and the image signals of the third row from the transmitted light amount corrector circuit 1. Then, the color separator circuit 8 produces the image signals C1 to C4 in the same manner as the VLPF 4 and HLPF 5. Specifically, as shown in FIG. 5, the color separator circuit 8, when fed with the image signals of those rows, plausibly calculates the image signals C1 to C3 other than the image signal C4.

Then, from these image signals C1 to C4, the color separator circuit 8 produces signals YL, Cr, and Cb. The signals YL, Cr, and Cb are signals such that YL=C1+C2 or C3+C4, Cr=C1−C2, and Cb=C4−C3. The signals YL, Cr, and Cb thus produced are fed to the RGB matrix circuit 9, which, on the basis of the signals YL, Cr, and Cb, produces R, G, and B signals that represent primary colors R, G, and B.

When the R, G, and B signals are fed to the color-difference matrix circuit 10, the color-difference matrix circuit 10, on the basis of the R, G, and B signals, produces color-difference signals R−Y and G−Y (where R−Y=0.70R−0.59G−0.11B and B−Y=−0.30R−0.59G+0.89B). When the color-difference signals R−Y and G−Y thus calculated are fed to the color encoder circuit 11, the color encoder circuit 11 forms these color-difference signals into color-difference signals having a phase difference of 90° and then mix them together to produce and output chrominance signals. The color-difference signals R−Y and G−Y are also fed to the color saturation value generator circuit 12, which then calculates color saturation by performing $[(R-Y)^2+(B-Y)^2]^{1/2}$.

4. Operation of the Color Saturation Value Accumulator Circuit 13

Next, the operation of the color saturation value accumulator circuit 13 will be described. The color saturation value accumulator circuit 13 is fed with color saturation values calculated, one for each image signal, by the color saturation value generator circuit 12, and accumulates them in each of the color saturation calculation regions described previously and shown in FIG. 3. Here, it is assumed that, as shown in FIG. 4, a color saturation calculation region ZKL (where K is a natural number fulfilling $1 \leq K \leq M$, and L is a natural number fulfilling $1 \leq L \leq N$) is a region in which a portion of the whole image that corresponds to the image signals LKL-l1 to LKL-$mn$ is reproduced. The image signals are fed in from one row after the next, starting in the first row, and their color saturation values are calculated by the color saturation value generator circuit 12 and fed to the color saturation value accumulator circuit 13.

Specifically, as the image signals L11-$l$1 to L11-$m$1 obtained in the color saturation calculation region Z11 are fed in, the color saturation value accumulator circuit 13 accumulates their color saturation values. When the color saturation values of the image signals L11-$l$1 to L11-$m$1 have been accumulated, the thus accumulated color saturation value is stored in a memory (not shown) that is provided in the color saturation value accumulator circuit 13 to store such accumulated color saturation values for each of the color saturation calculation regions. Here, the accumulated color saturation value of the image signals L11-$l$1 to L11-$m$1 is stored at an address at which to store the accumulated color saturation value for the color saturation calculation region Z11.

Next, as the image signals L21-$l$1 to L21-$m$1 obtained in the color saturation calculation region Z21 are fed in, the color saturation value accumulator circuit 13 accumulates their color saturation values. When the color saturation values of the image signals L21-$l$1 to L21-$m$1 have been accumulated, the thus accumulated color saturation value is stored at an address at which to store the accumulated color saturation value for the color saturation calculation region Z21. Thereafter, in similar manners, the color saturation values of the image signals L31-$l$1 to L31-$m$1, L41-$l$1 to L41-$m$1, . . . , LM1-$l$1 to LM1-$m$1 obtained in the color saturation calculation regions Z31, Z41, . . . , ZM1 are accumulated for each color saturation calculation region, and the thus accumulated color saturation values are stored at addresses for the corresponding saturation calculation regions in the memory (not shown).

When all the image signals of the first row have been fed in in this way, then the image signals of the second row are fed in. Specifically, first, as the image signals L11-$l2$ to L11-$m2$ obtained in the color saturation calculation region Z11 are fed in, the accumulated color saturation value, stored in the memory, of the image signals L11-$l1$ to L11-$m1$ obtained in the first row of the color saturation calculation region Z11 is read out, and, on top of this value, the color saturation values of the image signals L11-$l2$ to L11-$m2$ are accumulated. Then, the thus accumulated color saturation value of the image signals L11-$l1$ to L11-$m2$ is stored in the memory.

Then, in similar manners, as the image signals L21-$l2$ to L21-$m2$, L31-$l2$ to L31-$m2$, . . . , LM1-$l2$ to LM1-$m2$ obtained in the color saturation calculation regions Z21, Z31, . . . , ZM1 are fed in, the accumulated color saturation value, stored in the memory (not shown), of the image signals L21-$l1$ to L21-$m1$, L31-$l1$ to L31-$m1$, . . . , LM1-$l1$ to LM1-$m1$ are read out, and, on top of those values, the color saturation values of the image signals L21-$l2$ to L21-$m2$, L31-$l2$ to L31-$m2$, . . . , LM1-$l2$ to LM1-$m2$ are accumulated. Then, the thus accumulated color saturation values of the image signals L21-$l1$ to L21-$m2$, L31-$l1$ to L31-$m2$, . . . , LM1-$l1$ to LM1-$m2$ are stored in the memory (not shown).

Then, in similar manners, as the color saturation value accumulator circuit 13 accumulates the color saturation values of the image signals of the third to nth rows, the color saturation values of the image signals L11-$l1$ to L11-$mn$, L21-$l1$ to L21-$mn$, . . . , LM1-$l1$ to LM1-$mn$ obtained in the color saturation calculation regions Z11, Z21, . . . , ZM1 are accumulated for each color saturation calculation region, and the thus accumulated color saturation values are stored, as the results of color saturation value accumulation performed for each color saturation calculation region, in the memory (not shown). Next, in similar manners, as the color saturation value accumulator circuit 13 accumulates the color saturation values of the image signals of the (n+1)th to 2nth rows, the color saturation values of the image signals L12-$l1$ to L12-$mn$, L22-$l1$ to L22-$mn$, . . . , LM2-$l1$ to LM2-$mn$ obtained in the color saturation calculation regions Z12, Z22, . . . , ZM2 are accumulated for each color saturation calculation region, and the thus accumulated color saturation values are stored, as the results of color saturation value accumulation performed for each color saturation calculation region, in the memory (not shown).

Thereafter, as the image signals of the (2 n+1)th to (N×n)th rows are fed in, the operations described above are repeated, so that, in similar manners, the color saturation values of the image signals L13-$l1$ to L13-$mn$, L23-$l1$ to L23-$mn$, . . . , LMN-$l1$ to LMN-$mn$ obtained in the color saturation calculation regions Z13, Z23 . . . , ZMN are accumulated for each color saturation calculation region, and the thus accumulated color saturation values are stored, as the results of color saturation value accumulation performed for each color saturation calculation region, in the memory (not shown). The results of color saturation value accumulation thus obtained for each of the color saturation calculation regions Z11 to ZMN are fed to the image signal accumulator circuit 14, and also by way of the bus 16 to the CPU 15.

5. Operation of the Image Signal Accumulator Circuit 14

Next, the operation of the image signal accumulator circuit 14 will be described. The image signal accumulator circuit 14 is fed with the image signals C1 to C4 output from the CCD, and accumulates the image signals for each of the image signal types C1 to C4. The image signal accumulator circuit 14 is also fed, from the color saturation value accumulator circuit 13, with the results of color saturation value accumulation performed for each of the color saturation calculation regions Z11 to ZMN so that the image signal accumulator circuit 14 accumulates only the image signals that constitute those color saturation calculation regions that yield results of color saturation value accumulation lower than a threshold value.

Specifically, the results of color saturation value accumulation performed for each of the color saturation calculation regions Z11 to ZMN on the basis of the image signals of the previous field output from the CCD are fed to the image signal accumulator circuit 14, and, every time a color saturation calculation region is found to yield a result of color saturation value accumulation lower than a predetermined threshold value (hereinafter, such a color saturation calculation region will be referred to as a "low color saturation region"), the signal levels of the image signals obtained from that region are accumulated for each of the image signal types C1 to C4. Here, as in the color saturation value accumulator circuit 13 described previously, the results of accumulation performed for each of the image signal types C1 to C4 are stored, for each of the color saturation calculation regions, in a memory (not shown) provided in the image signal accumulator circuit 14. For those color saturation calculation regions that yield results of color saturation value accumulation higher than the threshold value, the image signals C1 to C4 are not accumulated.

When the image signals C1 to C4 have been accumulated for all of the color saturation calculation regions, the results are fed by way of the bus 16 to the CPU 15. When fed with the results of accumulation of the image signals C1 to C4 for each color saturation calculation region in this way, the CPU 15 calculates, for each color saturation calculation region, correction constants KC1, KC2, KC3, and KC4 to be fed to the transmitted light amount corrector circuit 1. Here, if the results of accumulation of the image signals C1 to C4 are assumed to be c1 to c4, respectively, the CPU 15 calculates the correction constants KC1, KC2, KC3, and KC4 such that $KC1 \times c1 = KC2 \times c2 = KC3 \times c3 = KC4 \times c4$.

Here, for color saturation calculation regions other than low color saturation regions, i.e. those color saturation calculation regions that yield results of color saturation value accumulation higher than the threshold value, the correction constants KC1 to KC4 calculated for the low color saturation regions nearest thereto are used as their correction constants KC1 to KC4. Specifically, for color saturation calculation regions other than low color saturation regions, the correction constants KC1 to KC4 calculated for the low color saturation regions least distant therefrom are used as their correction constants KC1 to KC4.

(Another Circuit Configuration for Calculating Constants to be Fed to the Transmitted Light amount Corrector Circuit)

The correction constants KC1 to KC4 for color saturation calculation regions other than low color saturation regions may be calculated in any other manner than is specifically described above. For example, it is also possible to calculate them from the correction constants KC1 to KC4 calculated for a plurality of near-by low color saturation regions on the basis of the relationship between the target color saturation calculation regions and those near-by low color saturation regions. Specifically, the correction constants KC1 to KC4 for color saturation calculation regions that are not low color saturation regions and that are located among a plurality of near-by low color saturation regions may be so calculated as to vary linearly with respect to the correction constants KC1 to KC4, respectively, calculated for those near-by low color saturation regions.

Alternatively, after the correction constants KC1 to KC4 for one low color saturation region are calculated, until the correction constants KC1 to KC4 for the next low color saturation region are calculated, the correction constants KC1 to KG4 calculated for the first low color saturation region may be used as the correction constants KC1 to KC4 for any color saturation calculation region that is located between those low color saturation regions and that yields a result of color saturation value accumulation higher than the threshold value.

(Another Circuit Configuration for Accumulating Image Signals)

In the above description, the image signals C1 to C4 are accumulated every time a low color saturation region is encountered. However, it is also possible to accumulate the image signals C1 to C4 for all low color saturation regions for every field. In this case, the accumulated values of the image signals C1 to C4 are each averaged for the number of low color saturation regions. Then, the correction constants KC1 to KC4 to be fed to the transmitted light amount corrector circuit 1 are calculated such that, if the thus averaged accumulated values of the image signals C1 to C4 are assumed to be c1, c2, c3, and c4, $KC1 \times c1 = KC2 \times c2 = KC3 \times c3 = KC4 \times c4$. As a result, identical correction constants KC1 to KC4 are obtained for all of the color saturation calculation regions constituting one field.

6. Operation of the Transmitted Light amount Corrector Circuit 1

Next, the operation of the transmitted light amount corrector circuit 1 will be described. The transmitted light amount corrector circuit 1 is fed with the correction constants KC1 to KC4 for the image signals C1 to C4 as calculated for each of the color saturation calculation regions Z11 to ZMN of the previous field by the CPU 15. The transmitted light amount corrector circuit 1 multiplies by the correction constants KC1 to KC4 fed from the CPU 15 the signal levels of the individual image signals C1 to C4 output from the CCD so that the amounts of light transmitted for those image signals C1 to C4 are counterbalanced. The thus corrected image signals C1 to C4 are fed to the line memory 2, the VLPF 4, and the color separator circuit 8. That is, the signal levels of the image signals C1 to C4 are multiplied by the correction constants KC1 to KC4 calculated for each of the color saturation calculation regions Z11 to ZMN for the previous field so that the amounts of light transmitted are counterbalanced for each of the image signal types C1 to C4.

7. Operation of the Luminance Signal Generator Circuit 6 and the Luminance Signal Processor Circuit 7

Next, the operation of the luminance signal generator circuit 6 and the luminance signal processor circuit 7 will be described. The luminance signal generator circuit 6 is fed, from the CPU 15 by way of the bus 16, with weight factors Lp (where $0 \leq Lp \leq 1$) to be assigned to the image signals fed individually from the VLPF 4 and the HLPF 5 so that, if the signal levels of the image signals fed from the VLPF 4 and the HLPF 5 are assumed to be Ca and Cb, the signal level of the luminance signal for those signals is calculated as $Lp \times Ca + (1-Lp) \times Cb$. This is performed according to the results of color saturation value accumulation performed for each of the color saturation calculation regions Z11 to ZMN by the color saturation value accumulator circuit 13 two fields before in such a way that, the lower the result of color saturation value accumulation, the greater the value of Lp and that, the higher the result of color saturation value accumulation, the smaller the value of Lp.

Specifically, the luminance signal generator circuit 6 is fed, from the HLPF 5, with the image signals C obtained as a result of the VLPF 4 and the HLPF 5 operating as described previously and, from the VLPF 4, with the image signals of the second row stored in the line memory 2. For example, in the case shown in FIG. 5, the luminance signal generator circuit 6 is fed, on the one hand, with the image signals C calculated by taking averages of the image signals C4 and the image signals C1 to C3 plausibly calculated as described previously, and is also fed, on the other hand, with the image signals C4 from the VLPF 4.

Then, the luminance signal generator circuit 6 adds together the signals obtained by multiplying the signal levels of the image signals C4 by the weight factors Lp and the signals obtained by multiplying the signals levels of the image signals C by the weight factors (1−Lp), and thereby produces luminance signals. The weight factors Lp used to produce luminance signals in this way are calculated by the CPU 15 according to the results, fed from the color saturation value accumulator circuit 13 of color saturation value accumulation performed for each of the color saturation calculation regions.

The luminance signals thus produced by the luminance signal generator circuit 6 are fed to the luminance signal processor circuit 7. The luminance signal processor circuit 7 subjects the luminance signals to edge enhancement and other processing, and then outputs the luminance signals so processed.

(Another Circuit Configuration for Generating Luminance Signals)

The luminance signal generator circuit 6 may produce luminance signals in any other manner than is specifically described above, where the image signals fed individually from the VLPF 4 and the HLPF 5 are assigned weight factors fed from the CPU 15. For example, it is also possible to make the luminance signal generator circuit 6 use the image signals from the VLPF 4 as luminance signals when the result of color saturation value accumulation performed by the color saturation value accumulator circuit 13 for a color saturation calculation region is lower than a predetermined threshold and use the image signals from the HLPF 5 when the result of color saturation value accumulation is higher than the predetermined threshold.

8. Method of Calculating Weight Factors to be Assigned to Image Signals

Next, the weight factors Lp will be described. As the CPU 15 is fed with the results of color saturation value accumulation performed for each of the color saturation calculation regions, the CPU 15 calculates, for each color saturation calculation region, a representative weight factor Lx according to the result of color saturation value accumulation for that region. Here, the representative weight factor Lx is made smaller for a "colored" color saturation calculation region that yields a high color saturation value accumulation result and larger for a nearly "colorless" color saturation calculation region that yields a low color saturation value accumulation result. When the representative weight factors Lx for all the color saturation calculation regions have been calculated, those representative weight factors Lx are stored as the weight factors for the image signals located at the centers of the individual color saturation calculation regions.

Figure 6:
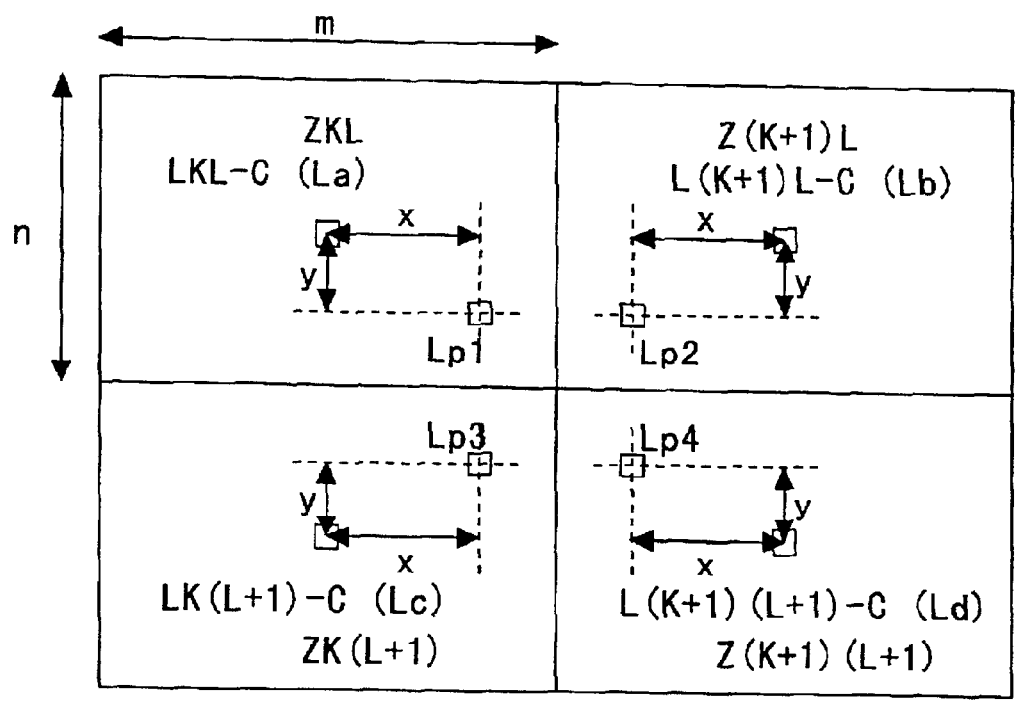
FIG. 6 is a diagram showing the relation between the weight factor and the position of an image signal.

Suppose that, as shown in FIG. 6, when the representative weight factors Lx for the individual color saturation calculation regions have been calculated in this way, the representative weight factors Lx for the color saturation calculation regions ZKL, Z(K+1)L, ZK(L+1), and Z(K+1)(L+1) are La, Lb, Lc, and Ld, respectively. Then, in the color saturation calculation region ZKL, the weight factor Lp1 for the image signal that lies within the region enclosed by the image signals LKL–C, L(K+1)L–C, LK(L+1)–C, and L(K+1)(L+1)–C located at the centers of the color saturation calculation regions ZKL, Z(K+1)L, ZK(L+1), and Z(K+1)(L+1), respectively, and that is distant from the image signal LKL–C by a distance of x (where x is a natural number fulfilling $0 \leq x \leq m/2$) horizontally and by a distance of y (where y is a natural number fulfilling $0 \leq y \leq n/2$) vertically is given by $$Lp1=\{[La \times (n-y)+Lc \times y] \times (m-x)/n + [Lb \times (n-y)+Ld \times y] \times x/n\}/m$$

Similarly, in the color saturation calculation region Z(K+1)L, the weight factor Lp2 for the image signal that lies within the region enclosed by the image signals LKL–C, L(K+1)L–C, LK(L+1)–C, and L(K+1)(L+1)–C located at the centers of the color saturation calculation regions ZKL, Z(K+1)L, ZK(L+1), and Z(K+1)(L+1), respectively, and that is distant from the image signal L(K+1)L–C by a distance of x (where x is a natural number fulfilling $0 \leq x \leq m/2$) horizontally and by a distance of y (where y is a natural number fulfilling $0 \leq y \leq n/2$) vertically is given by $$Lp2=\{[La \times (n-y)+Lc \times y] \times x/n + [Lb \times (n-y)+Ld \times y] \times (m-x)/n\}/m$$

Similarly, in the color saturation calculation region ZK(L+1), the weight factor Lp3 for the image signal that lies within the region enclosed by the image signals LKL–C, L(K+1)L–C, LK(L+1)–C, and L(K+1)(L+1)–C located at the centers of the color saturation calculation regions ZKL, Z(K+1)L, ZK(L+1), and Z(K+1)(L+1), respectively, and that is distant from the image signal LK(L+1)–C by a distance of x (where x is a natural number fulfilling $0 \leq x \leq m/2$) horizontally and by a distance of y (where y is a natural number fulfilling $0 \leq y < n/2$) vertically is given by $$Lp3=\{[La \times y+Lc \times (n-y)] \times (m-x)/n + [Lb \times y+Ld \times (n-y)] \times x/n\}/m$$

Similarly, in the color saturation calculation region Z(K+1)(L+1), the weight factor Lp4 for the image signal that lies within the region enclosed by the image signals LKL–C, L(K+1)L–C, LK(L+1)–C, and L(K+1)(L+1)–C located at the centers of the color saturation calculation regions ZKL, Z(K+1)L, ZK(L+1), and Z(K+1)(L+1), respectively, and that is distant from the image signal L(K+1)(L+1)–C by a distance of x (where x is a natural number fulfilling $0 \leq x \leq m/2$) horizontally and by a distance of y (where y is a natural number fulfilling $0 \leq y \leq n/2$) vertically is given by $$Lp4=\{[La \times y+Lc \times (n-y)] \times x/n + [Lb \times y+Ld \times (n-y)] \times (m-x)/n\}/m$$

In this way, the weight factors for the image signals that lie within the region enclosed by the image signals L11-C, LM1-C, L1N-C, and LMN-C located at the centers of the color saturation calculation regions Z11, ZM1, Z1N, and ZMN are calculated from the weight factors for the image signals located at the centers of the four adjacent color saturation calculation regions as described above. On the other hand, the weight factors for the image signals that lie outside the region enclosed by the image signals L11-C, LM1-C, L1N-C, and LMN-C, which are not determined by the method described above, are set to be equal to the weight factors of those of the image signals lying within the region enclosed by the image signals L11-C, LM1-C, L1N-C, and LMN-C which are located nearest to the image signals in question.

For example, suppose that the color saturation calculation region ZKL shown in FIG. 6 is Z11. Then, the weight factors of all the image signals located on the left of and above the image signal L11-C are set equal to the weight factor La of the image signal L11-C. For an image signal located on the left of the straight line connecting the image signal L11-C and the L12-C, if it is located a distance of y away from the image signal L11-C horizontally toward the image signal L12-C, its weight factor is calculated as [La×(n−y)+Lb×y]. For an image signal located above the straight line connecting the image signal L11-C and the L21-C, if it is located a distance of x away from the image signal L11-C toward the image signal L21-C, its weight factor is calculated as [La×(m−x)+Lb×x].

When the weight factors Lp have been calculated for all the image signals by CPU 15, they are fed to the luminance signal generator circuit 6, which then produces luminance signals from the image signals fed from the VLPF 4 and the HLPF 5 on the basis of those weight factors Lp.

(Another Circuit Configuration for Calculating Weight Factors)

The weight factors to be assigned to the individual image signals may be calculated in any other manner than is specifically described above. For example, it is also possible to make the weight factors for all the image signals constituting each color saturation calculation region uniformly equal to the weight factor determined according to the result of color saturation value accumulation performed for that region. In this case, the weight factors for the image signals vary from one color saturation calculation region to another.

It is also possible to calculate the weight factors for the image signals located within the region encircled by the image signals L11-C, LM1-C, L1N-C, and LMN-C just as described above, and calculate the weight factors for the image signals located outside the region encircled by the image signals L11-C, LM1-C, L1N-C, and LMN-C in such a way that they vary linearly with respect to the weight factors of four color saturation calculation regions, namely the color saturation calculation region in which the image signals in question are located, the two color saturation calculation regions that are located nearest to the mage signals in question and that are adjacent to the color saturation calculation region in which the image signals in question are located, and the color saturation calculation region that is adjacent to both of these two color saturation calculation regions adjacent to the first color saturation calculation region.

For example, suppose that the color saturation calculation region ZKL shown in FIG. 6 is Z11. Then, the weight factor Lpa for the image signal that is located at a distance of x (where x represents a natural number fulfilling $0 \leq x \leq m/2$) to the left of the image signal L11-C and at a distance of y (where y represents a natural number fulfilling $0 \leq y \leq n/2$) above the image signal L11-C is calculated on the basis of the weight factors for the image signals L11-C, L12-C, L21-C, and L22-C. Specifically, the weight factor Lpa is given by $$Lpa = \{[La \times (n+y)+Lc \times (-y)] \times (m+x)/n + [Lb \times (n+y)+Ld \times (-y)] \times (-x)/n\}/m$$

The weight factor Lpb for the image signal that is located at a distance of x (where x represents a natural number fulfilling $0 \leq x \leq m/2$) to the right of the image signal L11-C and at a distance of y (where y represents a natural number fulfilling $0 \leq y \leq n/2$) above the image signal L11-C is calculated on the basis of the weight factors for the image signals L11-C, L12-C, L21-C, and L22-C. Specifically, the weight factor Lpb is given by $$Lpb = \{[La \times (n+y) + Lc \times (-y)] \times (m-x)/n +$$
$$[Lb \times (n+y) + Ld \times (-y)] \times x/n\}/m$$

The weight factor Lpc for the image signal that is located at a distance of x (where x represents a natural number fulfilling $0 \leq x \leq m/2$) to the left of the image signal L11-C and at a distance of y (where y represents a natural number fulfilling $0 \leq y \leq n/2$) below the image signal L11-C is calculated on the basis of the weight factors for the image signals L11-C, L12-C, L21-C, and L22-C. Specifically, the weight factor Lpc is given by $$Lpc = \{[La \times (n-y) + Lc \times y] \times (m+x)/n +$$
$$[Lb \times (n-y) + Ld \times y] \times (-x)/n\}/m$$

9. Overall Operation

The operation of the image signal processing device as a whole, of which the constituent blocks operate as described above, will be described briefly below. For details about the operation of the individual blocks, refer to the descriptions given hereinbefore. How chrominance signals are produced has already been described, and therefore no description thereof will be repeated below.

First, when the image signals of a first field are fed in from the CCD, the color separator circuit 8, the RGB matrix circuit 9, the color-difference matrix circuit 10, and the color saturation value generator circuit 12 produce color saturation values, which are then accumulated for each of the color saturation calculation regions by the color saturation value accumulator circuit 13. Then, the results of color saturation value accumulation performed for the individual color saturation calculation regions are fed to the image signal accumulator circuit 14 and to the CPU 15.

Next, when the image signals of a second field are fed in from the CCD, every time a color saturation calculation region is encountered that yields a result of color saturation value accumulation lower than a threshold value, the signal levels of the image signals C1 to C4 fed from the CCD are accumulated for each of the image signal types C1 to C4, and are fed to the CPU 15. Here, the CPU 15 calculates the representative weight factors for the individual color saturation calculation regions according to the results of color saturation value accumulation performed for the individual color saturation calculation regions. In cases where the luminance signal generator circuit 6 uses either the image signals fed form the VLPF 4 or the image signals fed from the HLPF 5 as luminance signals, the CPU 15 produces, instead of the representative weight factors, choice control signals that permit choice between the VLPF 4 and the HLPF 5.

Then, according to the results of accumulation of the image signals C1 to C4 and the results of color saturation value accumulation performed for the previous field, the CPU 15 calculates correction constants KC1 to KC4 by which to multiply those image signals C1 to C4 so that the amounts of light transmitted for them are counterbalanced. Simultaneously, from the representative weight factors for the individual color saturation calculation regions, the CPU 15 calculates weight factors to be assigned to the individual image signals. These operations are performed when the image signals of a third field are fed in from the CCD.

When the image signals of a fourth field are fed in from the CCD, the correction constants KC1 to KC4 calculated by the CPU 15 are fed to the transmitted light amount corrector circuit 1. As a result, first, the image signals output from the CCD are corrected so that the amounts of light transmitted for those image signals are counterbalanced. Then, the image signals thus corrected to counterbalance the amounts of light transmitted are fed to the VLPF 4 and the HLPF 5, and the luminance signal generator circuit 6 produces luminance signals from the image signals fed from the VLPF 4 and the HLPF 5 on the basis of the weight factors or the choice control signals produced by the CPU 15. Then, the luminance signal processor circuit 7 subjects the thus produced luminance signals to edge enhancement and other processing, and outputs the luminance signals so processed.

In cases where the luminance signal generator circuit 6 uses either the image signals from the VLPF 4 or the image signals from the HLPF 5 as luminance signals, the luminance signal generator circuit 6 is fed with choice control signals. For color saturation calculation regions that yield results of color saturation value accumulation higher than a threshold value, the luminance signal generator circuit 6 outputs the image signals fed from the HLPF 5 as luminance signals to the luminance signal processor circuit 7, and, for color saturation calculation regions that yield results of color saturation value accumulation lower than the threshold value, the luminance signal generator circuit 6 outputs the image signals fed from the VLPF 4 as luminance signals to the luminance signal processor circuit 7.

Second Embodiment

Figure 7:
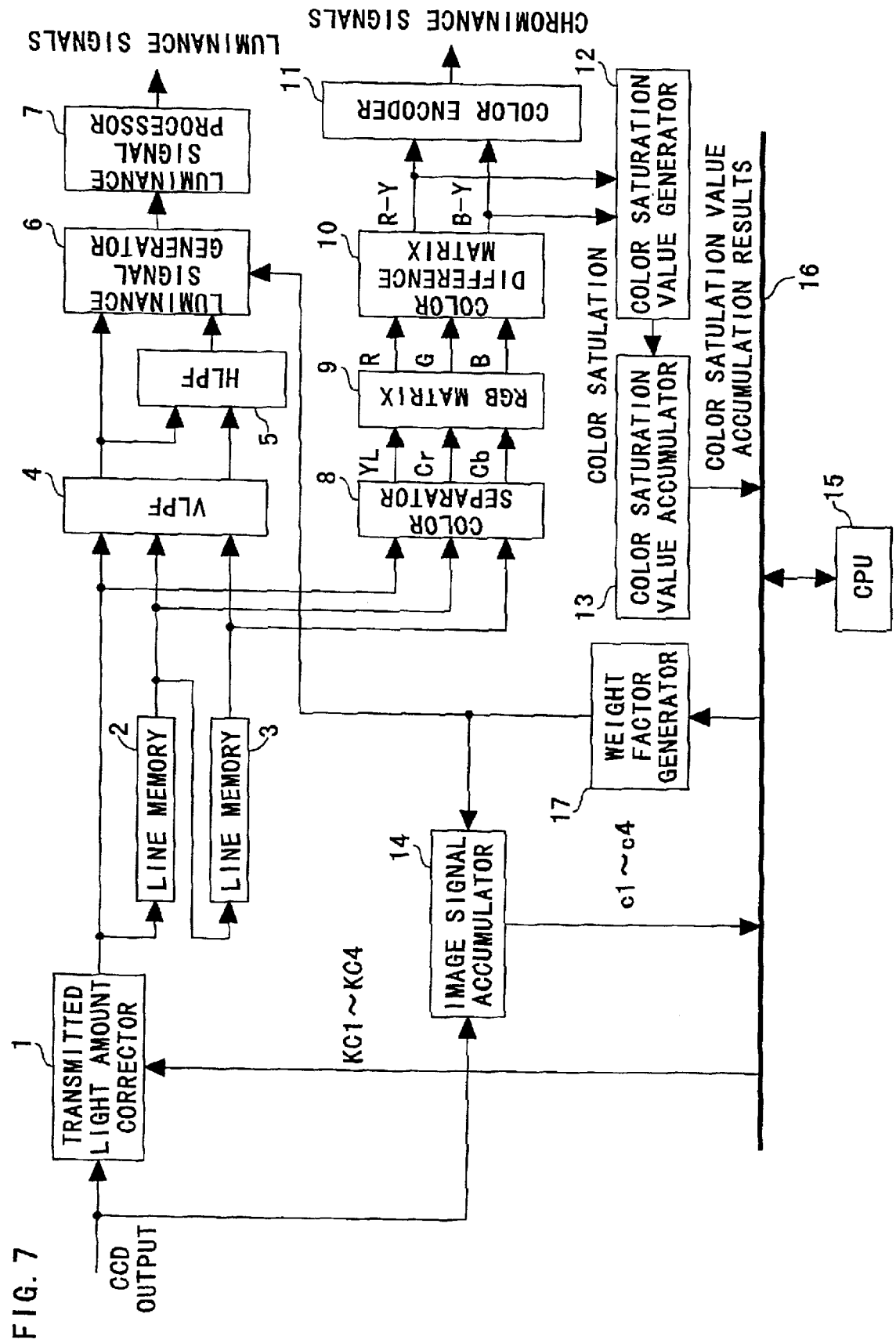
FIG. 7 is a block diagram showing the internal configuration of the image signal processing device of a second embodiment of the invention.

A second embodiment of the invention will be described below with reference to the drawings. FIG. 7 is a block diagram showing the internal configuration of the image signal processing device of this embodiment. It is to be noted that, in the image signal processing device shown in FIG. 7, such circuit blocks as serve the same purposes as in the image signal processing device shown in FIG. 2 are identified with the same reference numerals, and their detailed descriptions will not be repeated.

The image signal processing device shown in FIG. 7 is provided with a transmitted light amount corrector circuit 1, line memories 2 and 3, a VLPF 4, an HLPF 5, a luminance signal generator circuit 6, a luminance signal processor circuit 7, a color separator circuit 8, an RGB matrix circuit 9, a color-difference matrix circuit 10, a color encoder circuit 11, a color saturation value generator circuit 12, a color saturation value accumulator circuit 13, an image signal accumulator circuit 14, a CPU 15, a bus 16, and a weight factor generator circuit 17 that produces weight factors to be fed to the luminance signal generator circuit 6.

As described above, the image signal processing device of this embodiment has, in addition to the same constituent blocks as the image signal processing device of the first embodiment (FIG. 2), a weight factor generator circuit 17. This image signal processing device differs from that of the first embodiment in that, when the representative weight factors for the individual color saturation calculation regions are calculated by the CPU 15, they are fed to the weight factor generator circuit 17, which then calculates the weight factors for the individual image signals.

The weight factors calculated by the weight factor generator circuit 17 are fed to the luminance signal generator circuit 6. According to these weight factors, the luminance signal generator circuit 6 adds together the image signals fed form the VLPF 4 and the image signals fed from HLPF 5 with their respective weights assigned thereto, and thereby produces luminance signals, which are then fed to the luminance signal processor circuit 7. Moreover, the weight factor generator circuit 17 feeds the image signal accumulator circuit 14 with control signals to control whether to accumulate the image signals C1 to C4 or not for each of the color saturation calculation regions.

Here, it is also possible to judge whether to accumulate the image signals C1 to C4 or not for each of the color saturation calculation regions according to the representative weight factors for the individual color saturation calculation regions. It is also possible to calculate the weight factors for all the image signals constituting each color saturation calculation region, then calculate the average or accumulated value of these weight factors, and judge, according to this average or accumulated value, whether to accumulate the image signals C1 to C4 or not for that color saturation calculation region. Then, for the color saturation calculation regions for which color saturation value accumulation has been judged to be necessary, the image signals C1 to C4 are accumulated for each of the image signal types C1 to C4 to calculate their accumulated values.

It is also possible to calculate the weight factors for all the image signals constituting each color saturation calculation region and then judge, according to the thus calculated weight factors, whether to accumulate the image signals C1 to C4 constituting that color saturation calculation region or not for each of the image signals. In this case, in each color saturation calculation region, the signal levels of the image signals that have been judged to be accumulated are accumulated, and in addition the numbers of image signals thus accumulated are counted for each of the image signal types C1 to C4. Then, the values accumulated for each of the image signal types C1 to C4 are divided by the numbers of image signals counted for each of the image signal types C1 to C4 to calculate their averages.

When the accumulated values or averages of the image signals of a color saturation calculation region have been calculated in this way, they are fed to the CPU 15, which then calculates correction constants KC1 to KC4 with which to correct the image signals of that color saturation calculation region. Here, as in the first embodiment, for a color saturation calculation region for which no accumulated values or averages have been calculated, correction constants are calculated on the basis of the correction constants KC1 to KC4 calculated for nearby color saturation calculation regions.

When the correction constants KC1 to KC4 have been calculated in this way, they are fed to the transmitted light amount corrector circuit 1. Then, the signal levels of the image signals C1 to C4 of the next field are multiplied by the correction constants KC1 to KC4, respectively, and thereby the image signals of the next field output from the CCD are corrected so that the amounts of light transmitted for those signals are counterbalanced. Then, the line memories 2 and 3, the VLPF 4, the HLPF 5, and the luminance signal generator circuit 6 produce luminance signals on the basis of the image signals thus corrected by the transmitted light amount corrector circuit 1 to counterbalance the amounts of light transmitted for them and the weight factors fed from the weight factor generator circuit 17. Here, as in the first embodiment, the representative weight factor for a color saturation calculation region is calculated in such a way that, the lower the result of color saturation value accumulation performed for that color saturation calculation region, the greater the representative weight factor for that color saturation calculation region. Thus, for the image signals obtained in a low color saturation region, the image signals fed from the VLPF 4 and the image signals fed from the HLPF 5 are added together with a heavier weight assigned to the image signals fed from the VLPF 4.

Thus, the image signal processing device shown in FIG. 7 operates in the following manner. First, when the image signals of a first field are fed in from the CCD, the accumulated color saturation values for the individual color saturation calculation regions are calculated from those image signals. Next, when the image signals of a second field are fed in from the CCD, weight factors are calculated, and, when the image signals of a third field are fed in from the CCD, the accumulated values of the image signals C1 to C4 are calculated for each of the color saturation calculation regions. When the accumulated values of the image signals C1 to C4 have been calculated in this way, while the image signals of a fourth field are fed in from the CCD, correction constants KC1 to KC4 are calculated. Then, according to these correction constants KC1 to KC4, the image signals of a fifth field fed in from the CCD are corrected to counterbalance the amounts of light transmitted for them, and are added together with weights assigned thereto according to the weight factors.

In this embodiment, correction constants KC1 to KC4 are calculated for each color saturation calculation region. However, it is also possible to calculate correction constants KC1 to KC4 for each field. In this case, for example, the weight factor generator circuit 17 judges whether to accumulate image signals or not according to the weight factors calculated individually for those image signals, and controls the image signal accumulator circuit 14 accordingly. In this way, the accumulated values of the image signals C1 to C4 are calculated for each of the image signal types C1 to C4, and simultaneously the numbers of image signals C1 to C4 thus accumulated are counted. Then, the values accumulated for each of the image signal types C1 to C4 are divided by the numbers of image signals counted for each of the image signal types C1 to C4 to calculate the averages of the image signals C1 to C4. Then, on the basis of the accumulated values or averages of the image signals C1 to C4 thus calculated, the CPU 15 can calculate correction constants KC1 to KC4.

It is also possible to build the luminance signal generator circuit as a circuit that chooses and outputs either the image signals fed from the VLPF or the image signals fed from the HLPF as luminance signals, and use, instead of the weight factor generator circuit, a circuit that outputs choice control signals that permit choice between the image signals fed from the VLPF and the image signals fed from the HLPF.

In the first embodiment, when the image signals of a fourth field are fed in, the correction constants KC1 to KC4 are fed to the transmitted light amount corrector circuit and the weight factors are fed to the luminance signal generator circuit. However, it is also possible to feed the weight factors to the luminance signal generator circuit when the image signals of a third field are fed in and feed the correction constants KC1 to KC4 to the transmitted light amount corrector circuit when the image signals of a fourth field are fed in. In this case, the weight factors and the correction constants KC1 to KC4 produced on the basis of the results of color saturation value accumulation performed for the individual color saturation calculation regions of the same field are output one field apart; that is, the correction constants KC1 to KC3 are output one field later.

In the present invention, the VLPF and the HLPF first calculate three of the image signals C1 to C4 plausibly, and then the luminance signal generator circuit is fed with image signals obtained as a result of the HLPF taking averages of the image signals C1 to C4 including three image signals thus plausibly calculated. However, the luminance signal generator circuit may be fed with image signals obtained by adding together the three plausibly calculated image signals and the remaining one image signal with weights assigned thereto.

The present invention is applicable not only to image signal processing devices for processing image signals output from a single-panel color CCD having color filters arranged as shown in FIG. 1, but also to image signal processing devices for processing image signals output from a CCD having R, G, and B color filters, or a CCD having color filters arranged in any other manner, or a two-panel color CCD.

In the present invention, the image signals that have been corrected by the transmitted light amount corrector circuit so as to counterbalance the amounts of light transmitted for them are fed to color separator circuit so that eventually chrominance signals are output from the color encoder. However, it is also possible to feed the image signals output from the CCD directly, i.e. without first correcting them to counterbalance the amounts of light transmitted, to the color separator circuit so that eventually chrominance signals are output from the color encoder.

According to the present invention, low color saturation regions in which color saturation is low are detected, and, according to the color saturation of such low color saturation regions, image signals are corrected to counterbalance the amounts of light transmitted for them. This makes it possible to obtain image signals with uniform signal levels from image signals fed from pixels provided with a plurality of types of color filters that exhibit different filtering characteristics when a colorless subject is shot. Moreover, by using, as luminance signals for low color saturation regions, image signals that have been corrected to counterbalance the amounts of light transmitted for them, it is possible to produce luminance signals one for each pixel. This helps enhance resolution as compared with cases in which luminance signals are produced by smoothing a plurality of image signals. Moreover, by using, as luminance signals, signals obtained by adding together corrected image signals and smoothed image signals, which are obtained by smoothing a plurality of image signals, with weights assigned thereto according to the color saturation of original image signals, it is possible to reproduce images with smooth color saturation changes from low color saturation to high color saturation regions.

What is claimed is:

1. An image signal processing device for producing luminance signals from image signals output from a solid-state image-sensing device having a plurality of types of color filters arranged one for each of pixels thereof, comprising:

an image signal accumulator for accumulating, for each of the types of color filters provided for the pixels of the solid-state image-sensing device, signal levels of image signals output from those of the pixels which are sensing a low color saturation region in which color saturation is low;

a transmitted light amount corrector for producing, based on correction constants set one for each of the types of color filters provided for the pixels of the solid-state image-sensing device, corrected image signals by correcting image signals output from the pixels of the solid-state image-sensing device in order to counterbalance, for each of the types of color filters, amounts of light transmitted through the color filters;

a correction constant calculator for setting, based on the signal levels of the image signals accumulated for each of the types of color filters in the image signal accumulator, the correction constants one for each of the types of color filters and feeding the thus set correction constants to the transmitted light amount corrector;

a first luminance signal generator for smoothing a corrected image signal currently being fed thereto from the transmitted light amount corrector as obtained from a currently targeted pixel and corrected image signals obtained from a plurality of pixels located in neighborhood of the currently targeted pixel in order to produce a luminance signal for the currently targeted pixel; and a second luminance signal generator for newly producing a luminance signal for the currently targeted pixel based on the corrected image signal fed thereto from the transmitted light amount corrector as obtained from the currently targeted pixel and the luminance signal fed thereto from the first luminance signal generator as produced for the currently targeted pixel.

2. An image signal processing device as claimed in claim 1, wherein, when the currently targeted pixel is a pixel that is sensing the low color saturation region, the second luminance signal generator uses as a luminance signal for the currently targeted pixel the corrected image signal fed from the transmitted light amount corrector, and, when the currently targeted pixel is a pixel that is sensing a region other than the low color saturation region, the second luminance signal generator uses as a luminance signal for the currently targeted pixel the luminance signal fed from the first luminance signal generator.

3. An image signal processing device as claimed in claim 1, wherein the second luminance signal generator uses as a luminance signal for the currently targeted pixel a signal produced by adding together the corrected image signal fed from the transmitted light amount corrector and the luminance signal fed from the first luminance signal generator with predetermined weights assigned to these two signals according to the color saturation of the image signal obtained from the currently targeted pixel.

4. An image signal processing device as claimed in claim 3, wherein the second luminance signal generator produces the luminance signal with the weights assigned in such a way that, the lower the color saturation of the image signal, the heavier the weight assigned to the corrected image signal.

5. An image signal processing device as claimed in claim 1, wherein the correction constant calculator sets the correction constants in such a way that the correction constants yield identical values when multiplied by the signal levels, accumulated for each of the types of color filters, of the image signals obtained from the pixels that are sensing the low color saturation region.

6. An image signal processing device as claimed in claim 1, wherein the transmitted light amount corrector produces the corrected image signals by multiplying the image signals by the correction constants.

7. An image signal processing device as claimed in claim 1, further comprising:

a color saturation accumulator for accumulating color saturation values of image signals within each of a plurality of color saturation calculation regions provided within an image constituting one frame obtained by reproducing the image signals; and a color saturation evaluator for judging whether or not each color saturation calculation region is a low color saturation region in which color saturation is low according to the color saturation values thus accumulated.

8. An image signal processing device as claimed in claim 1, further comprising:
  a chrominance signal generator for producing chrominance signals from the image signals,
  wherein color saturation of the image signals is determined based on color difference signals produced within the chrominance signal generator.

9. An image signal processing method for producing luminance signals from image signals output from a solid-state image-sensing device having a plurality of types of color filters arranged one for each of pixels thereof, including:
  a step of accumulating, for each of the types of color filters provided for the pixels of the solid-state image-sensing device, signal levels of image signals output from those of the pixels which are sensing a low color saturation region in which color saturation is low;
  a step of setting, based on the signal levels of the image signals accumulated for each of the types of color filters provided for the pixels of the solid-state image-sensing device, correction constants with which to counterbalance amounts of light transmitted through the color filters provided for the pixels that are sensing the low color saturation region;
  a step of producing corrected image signals by multiplying by the correction constants the image signals output from the pixels of the solid-state image-sensing device that are sensing the low color saturation region; and
  a step of using the corrected image signals as luminance signals for the pixels of the solid-state image-sensing device that are sensing the low color saturation region.

10. An image signal processing method as claimed in claim 9,
  wherein smoothed image signals produced by smoothing image signals obtained from one set after another of a plurality of adjacent pixels are used as luminance signals for image signals output from those pixels of the solid-state image-sensing device which are sensing a region other than the low color saturation region.

11. An image signal processing method as claimed in claim 9,
  wherein the correction constants are so set as to yield identical values when multiplied by the signal levels, accumulated for each of the types of color filters, of the image signals obtained from the pixels that are sensing the low color saturation region.

12. An image signal processing method as claimed in claim 9,
  wherein color saturation values of image signals are accumulated within each of a plurality of color saturation calculation regions provided within an image constituting one frame obtained by reproducing the image signals, and whether or not each color saturation calculation region is a low color saturation region in which color saturation is low is judged according to the color saturation values thus accumulated.

13. An image signal processing method for producing luminance signals from image signals output from a solid-state image-sensing device having a plurality of types of color filters arranged one for each of pixels thereof, including:
  a step of accumulating, for each of the types of color filters provided for the pixels of the solid-state image-sensing device, signal levels of image signals output from those of the pixels which are sensing a low color saturation region in which color saturation is low;
  a step of setting, based on the signal levels of the image signals accumulated for each of the types of color filters provided for the pixels of the solid-state image-sensing device, correction constants with which to counterbalance amounts of light transmitted through the color filters provided for the pixels that are sensing the low color saturation region;
  a step of producing corrected image signals by multiplying by the correction constants the image signals output from the pixels of the solid-state image-sensing device that are sensing the low color saturation region; and
  a step of using, as luminance signals for the image signals, signals produced by adding together the corrected image signals and smoothed image signals produced by smoothing image signals obtained from one set after another of a plurality of adjacent pixels, wherein the corrected image signals and the smoothed image signals are added together with predetermined weights assigned thereto based on the color saturation values of the image signals.

14. An image signal processing method as claimed in claim 13,
  wherein the luminance signals are produced with the weights assigned in such a way that, the lower the color saturation of the image signals, the heavier the weight assigned to the corrected image signals than to the smoothed image signals.

15. An image signal processing method as claimed in claim 13,
  wherein the correction constants are so set as to yield identical values when multiplied by the signal levels, accumulated for each of the types of color filters, of the image signals obtained from the pixels that are sensing the low color saturation region.

16. An image signal processing method as claimed in claim 13,
  wherein color saturation values of image signals are accumulated within each of a plurality of color saturation calculation regions provided within an image constituting one frame obtained by reproducing the image signals, and whether or not each color saturation calculation region is a low color saturation region in which color saturation is low is judged according to the color saturation values thus accumulated.

* * * * *